United States Patent
Sarmiento et al.

(10) Patent No.: US 7,095,747 B2
(45) Date of Patent: Aug. 22, 2006

(54) METHOD AND APPARATUS FOR A MESSAGING PROTOCOL WITHIN A DISTRIBUTED TELECOMMUNICATIONS ARCHITECTURE

(75) Inventors: Jesus L. Sarmiento, Miami, FL (US); Jack Bloch, Boca Raton, FL (US); Amruth Laxman, Boca Raton, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 1072 days.

(21) Appl. No.: 10/109,128

(22) Filed: Mar. 28, 2002

(65) Prior Publication Data
US 2002/0191616 A1 Dec. 19, 2002

Related U.S. Application Data

(60) Provisional application No. 60/279,295, filed on Mar. 28, 2001, provisional application No. 60/279,279, filed on Mar. 28, 2001.

(51) Int. Cl.
*H04L 12/28* (2006.01)
(52) U.S. Cl. .................... 370/401; 370/352; 370/467; 379/88.17; 709/203
(58) Field of Classification Search ........ 370/352–356, 370/400, 401, 466, 467; 726/13; 709/203, 709/238–242
See application file for complete search history.

(56) References Cited

U.S. PATENT DOCUMENTS 4,897,874 A * 1/1990 Lidinsky et al. .............. 726/13
6,826,173 B1 * 11/2004 Kung et al. .................. 370/352

* cited by examiner

*Primary Examiner*—John Pezzlo

(57) ABSTRACT

A method for message handling in a telecommunications system having a network services processor (NSP) for accessing, processing, and distributing telecommunications in conformance with a predefined signaling system and for distributing processing applications including call handling and routing to a plurality of platforms, each platform having a unique address and responds to application specific messages, the method comprising: connecting the plurality of platforms to local area networks (LANs), the plurality of platforms include packet managers (PMs) for accessing, processing, and distributing packetized call data over a packet network and a plurality of media control platforms (MCPs) for accessing, processing, and distributing media tasks (MCTs); connecting the LANs to a corresponding plurality of interconnect controllers (ICCs), each ICC for interfacing the NSP with the plurality of platforms through a corresponding LAN; and distributing application specific messages to the plurality of platforms via a message protocol (hiQ) having a message frame which encapsulates application specific messages within a standard LAN protocol.

22 Claims, 3 Drawing Sheets

METHOD AND APPARATUS FOR A MESSAGING PROTOCOL WITHIN A DISTRIBUTED TELECOMMUNICATIONS ARCHITECTURE

CONTINUATION DATA

This application claims the benefit of priority under 35 U.S.C. 119(e) to two copending U.S. Patent Provisional Applications, Ser. Nos. 60/279,295 and 60/279,279, both filed on Mar. 28, 2001, the contents of each of said applications being incorporated herein by reference.

This application is also related to the following U.S. patent applications: U.S. patent application Ser. No. 10/109, 293 filed Mar. 28, 2002 entitled Distributed Architecture for a Telecommunications Software Switch; U.S. patent application Ser. No. 10/108,603 filed Mar. 28, 2002 entitled Distributed Architecture for a Telecommunications System; U.S. patent application Ser. No. 10/109,196 fired Mar. 28, 2002 entitled Method and Apparatus for Providing A Software Adaptation Layer in a Telecommunications System; U.S. patent application Ser. No. 10/115,453 filed Mar. 28, 2002 entitled Method and Apparatus for a Deriving a Standard MAC Address from A Physical Location; U.S. patent application Ser. No. 10/109,157 filed Mar. 28, 2002 entitled Method and Apparatus for A Centralized Maintenance System within a Distributed Telecommunications Architecture; and U.S. patent application Ser. No. 10/109, 149 filed Mar. 28, 2002 entitled Method and Apparatus for Providing a Proprietary Data Interface in a Distributed Telecommunications System, the contents of each of said applications being incorporated by reference herein.

BACKGROUND OF THE INVENTION

Digital switching systems are used in telecommunications systems for accessing, processing, and distributing telecommunications data including voice data and telephone calls. The digital switching systems are highly complex and for the most part are the result of many years of evolution and enhancements. A number of digital switching systems made by different manufacturers are used to handle telecommunications traffic throughout the world. Because the different manufacturers designed their systems with different hardware and software, many components and functions of one system are not compatible with another. Even if the same or similar components and functions were employed, as different systems are upgraded with new hardware, architectural modifications and continuous development of new or enhanced features, the systems diverge in similarity and compatibility.

As global and local call traffic continues to increase, telephone network operators demand increased call handling capacity from exchanges. A typical exchange in the United States handles about one million busy hour call attempts (BHCA). Most switching systems can be upgraded to handle more call capacity. However, many exchanges are already reaching their capacity in terms of processing capabilities and the quick-fix type upgrades cannot fulfill the call handling capability being specified, which calls for capability to handle six million BHCA in present and future systems. System architectural changes and redesigns may be the only long-term solution.

Network operators are therefore desirous of the development of switching and communication systems having architecture that provide increased processing capabilities but also fit within the existing framework with minimal impact on the required feature set, e.g., having a uniform view and single-entry point with respect to both an operations perspective and a signaling perspective. It is also desirous that the new architecture will be able to adapt to commercially available platforms and existing messaging protocols so that significant improvements in throughput and capacity may be realized by upgrading the platforms as the improved technology becomes available.

With the increase in capabilities and functions, it is inevitable that the telecommunications systems continue to increase in size in terms of both hardware and software components. A bigger system requires a larger overhead in terms of maintenance and testing functions as more components need to be tested. If each existing and added component and their interconnects has to be individually tested, this overhead cost can increase exponentially, causing reduced throughput.

A need therefore exists for a telecommunications system which fulfills the distributed processing and multiservice demands described above, but having an architecture with messaging protocol which facilitates the open distributed network environment and supports multiple services on a common networking infrastructure. It is also desirous that the messaging protocol efficiently addresses each component of the telecommunications system and facilitates efficient processing, testing, and maintenance functions.

SUMMARY OF THE INVENTION

According to a preferred embodiment of the present invention, a telecommunications system is provided, having a network services processor (NSP) for handling telecommunications in conformance with a predefined signaling system and for distributing processing applications including call handling and routing to a plurality of platforms, each platform having a unique address and responds to application specific messages, comprising: a plurality of packet managers (PMs) for accessing, processing, and distributing packetized call data over a packet network; a plurality of media control platforms (MCPs) for accessing, processing, and distributing media tasks (MCTs); a plurality of interconnect controllers (ICCs) and corresponding plurality of local area networks (LANs), each for interfacing the NSP with the plurality of platforms including the PMs and the MCPs through a corresponding LAN, wherein a message protocol (hiQ) is employed which encapsulates the application specific messages within a standard LAN protocol for distribution among the plurality of platforms connected to the LANs.

Preferably, the hiQ protocol includes a unicast message frame wherein one of the plurality of platforms connected to the LANs is addressed. The plurality of LANs include at least one partner pair of LANs, acting as primary and redundant LANs in active and standby modes, the plurality of platforms connected to the primary LAN being active in processing applications and the plurality of platforms connected to the redundant LAN being in standby mode. The hiQ protocol includes a multicast message frame wherein each of the plurality of platforms connected to the partner pair LANs is addressed.

According to an aspect of the invention, the ICC includes means for switching over a redundant LAN from standby to active upon determination of a fault in a platform connected to the primary LAN. The hiQ protocol includes a broadcast message frame wherein all of the plurality of platforms connected to the LANs is addressed, wherein the ICC distributes a first broadcast message frame having a status request broadcasted to the plurality of platforms connected to the LANs, and the ICC performs fault identification and location among the plurality of platforms by examining responses received from the plurality of platforms. The ICC determines a fault exists in a platform if the platform fails to respond to the status request within a specified period of time. The ICC distributes a second broadcast message frame which includes responses from all the plurality of platforms connected to the LANs to provide a connectivity map of each of the plurality of platforms connected to the LANs. Preferably, the first broadcast message frame and the second broadcast message frame are consecutive message frames.

A method of message handling in a telecommunications system is also provided, the telecommunications system having a network services processor (NSP) for accessing, processing, and distributing telecommunications in conformance with a predefined signaling system and for distributing processing applications including call handling and routing to a plurality of platforms, each platform having a unique address and responds to application specific messages, the method comprising: connecting the plurality of platforms to local area networks (LANs), the plurality of platforms include packet managers (PMs) for accessing, processing, and distributing packetized call data over a packet network and a plurality of media control platforms (MCPs) for accessing, processing, and distributing media tasks (MCTs); connecting the LANs to a corresponding plurality of interconnect controllers (ICCs), each ICC for interfacing the NSP with the plurality of platforms through a corresponding LAN; and distributing application specific messages to the plurality of platforms via a message protocol (hiQ) having a message frame which encapsulates application specific messages within a standard LAN protocol.

Preferably, the hiQ protocol includes an unicast message frame wherein one of the plurality of platforms connected to the LANs is addressed. The method preferably further including the step of assigning one partner pair from the plurality of LANs to act as primary and redundant LANs in active and standby modes, the plurality of platforms connected to the primary LAN being active in processing applications and the plurality of platforms connected to the redundant LAN being in standby mode. The hiQ protocol includes a multicast message frame wherein each pair of the plurality of platforms connected to LANs are addressed.

The method preferably further including the step of switching over a redundant LAN from standby to active upon determination of a fault in a platform connected to the primary LAN.

According to another embodiment of the present invention, the hiQ protocol includes a broadcast message frame wherein all of the plurality of platforms connected to the LANs is addressed. The method further including the steps of distributing a first broadcast message frame having a status request broadcasted to the plurality of platforms connected to the LANs, and performing fault identification and location among the plurality of platforms by examining responses received from the plurality of platforms, and the step of distributing a second broadcast message frame which includes responses from all the plurality of platforms connected to the LANs, wherein the first broadcast message frame and the second broadcast message frame are consecutive message frames. Preferably, the standard LAN protocol is UDP/IP and the predefined signaling system is SS7.

BRIEF DESCRIPTION OF THE DRAWINGS

These and further features of the invention may be better understood with reference to the accompanying specification, drawings, and appendix describing preferred embodiments of the invention, in which.

DETAILED DESCRIPTION OF PREFERRED EMBODIMENTS

According to an aspect of the present invention, an hiQ protocol encapsulates application messages within a standardized protocol and provides the addressing capabilities to address all resources or platforms connected to a centralized maintenance system with a single message. The protocol allows addressing a single platform and a single application running on that platform. For redundancy, the protocol addresses a redundant pair of platforms and redundant pair of applications, and allows addressing a single unit and multiple applications in each unit.

The hiQ architecture having a centralized maintenance system and method is employed which monitors all connected resources or platforms by broadcasting status requests to and receiving responses from each connected resource or platform, preferably in consecutive single centralized message frames. By monitoring the responses to the broadcast request, the centralized maintenance system can determine which units failed by their failure to respond within a specified amount of time. The failed units can be reported as defective for alarming purposes.

According to a further aspect of the invention, the status response message having the last set of responses is broadcasted to each connected unit. This allows each unit to have a complete "connectivity" map.

According to another aspect of the present invention, the monitoring system employs a redundant system where there are two units and two paths for each application to ensure reliable operation. When one unit of the two partner pair fails, the redundant pair unit is switched over to complete the application. The hiQ protocol allows the delivery of a single message to both members of the pair. This provides the needed synchronization for units and processes.

Figure 1:
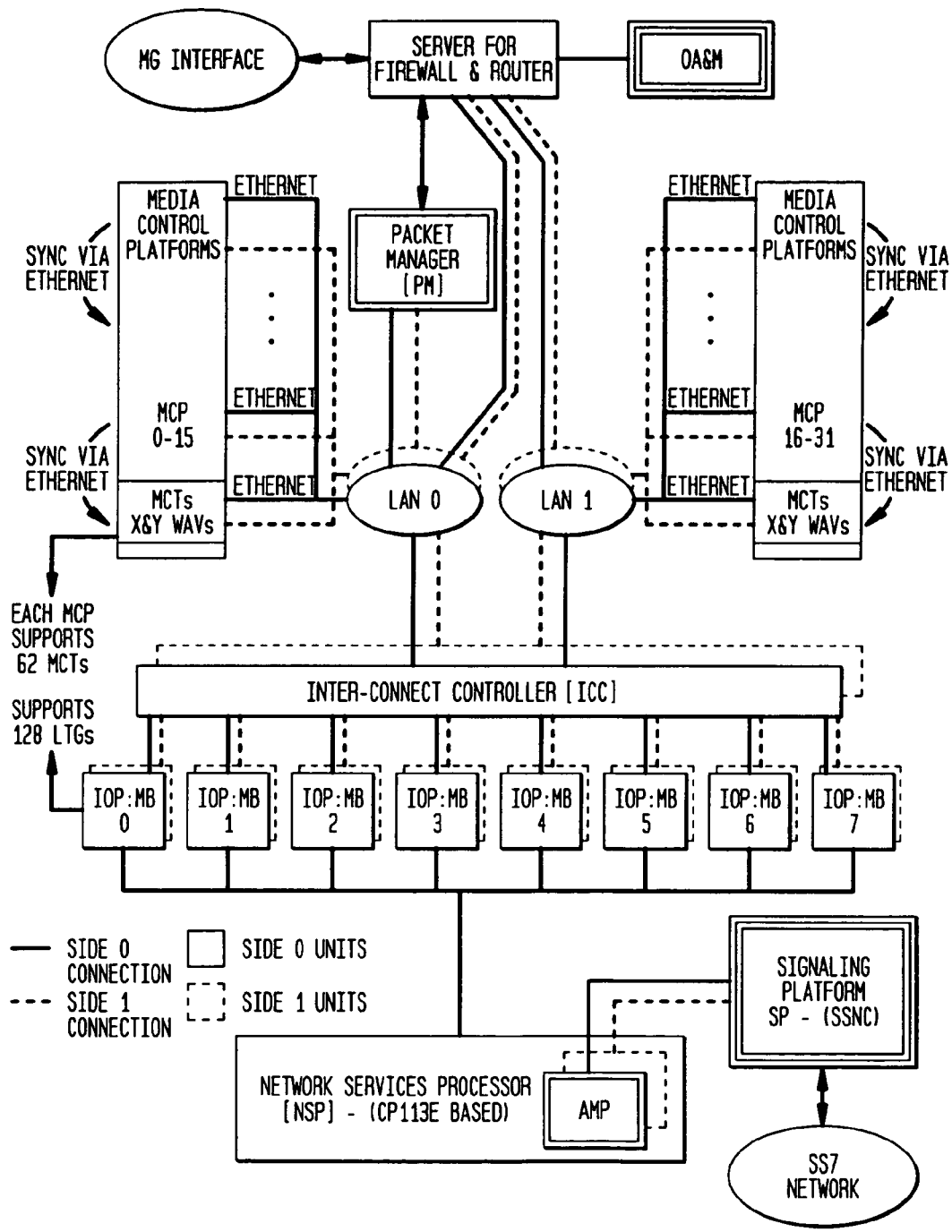
FIG. 1 shows a block diagram of an hiQ architecture according to a preferred embodiment of the present invention.

FIG. 1 shows the basic hiQ architecture, which includes seven main functional parts, namely, the Network Services Processor (NSP), the Inter-Connect Controller (ICC), the Packet Manager (PM), distributed Media Control Platforms (MCP), the Integrated Signaling Gateway [ISG-(SSNC)] and the connection medium which allows all of the functional blocks to communicate with one another. The connection medium itself provides the seventh part as well, since it is split into two entities, namely, the connection between the NSP and ICC and the connection between the ICC and distributed platforms. Unless specifically stated otherwise, each of the main functional parts within the hiQ architecture preferably includes a Pentium-class processor and associate memory for buffering data and storing software programs to be executed by the associated processor to implement accessing, processing, and distribution of applications. The architecture supports 4 000 000 or more BHCA. However, for the purposes of call model calculation, it should be taken into account that the initial offering will support 60 000 trunks and the second step will support 250 000 trunks. A mean holding time of 180 s/call is used, therefore 60 000 trunks (30 000 incoming and 30 000 outgoing) equates to 600 000 BHCA (or 167 calls/s). 250 000 trunks (125 000 incoming and 125 000 outgoing) equates to 2 500 000 BHCA (or 695 calls/s).

The NSP is preferably a digital switching system such as the EWSD CP113C, which is capable of handling call processing pursuant to call signaling systems such as SS7. The NSP functions include providing the feature/CALLP database, loading of necessary data to the distributed MCP's, distributing applications to the PMs and MCPs, and perform those coordinated functions necessary to keep the system running (e.g. maintenance, recovery, administration, alarming etc).

The Signaling System Network Control (SSNC) and the Integrated Signaling

Gateway (ISG) is part of the Signaling Platform (SP) for handling SS7 links including directly terminating SS7 links, routing incoming SS7 packets to NSP or MCPs, routing outgoing SS7 packets to appropriate SS7 destination(s), and performing SS7 maintenance and SS7 administration functions.

The ICC provides a bi-directional interface between the NSP and the distributed MCP's, PM, and Signaling Gateway. In addition to providing the interface, it also provides the protocol conversion between standard EWSD messaging (e.g., MBU/MCH based addressing) and Ethernet Media Access Control (MAC) addressing. Thus, messaging within the hiQ architecture can be provided via fast Ethernet (100 MB/s LAN segment(s)). The ICC also handles the routine test interface from the NSP. The ICC supervises the LAN interface and reports the connection status of the distributed platforms to the NSP. The ICC also detects any LAN faults and report any faults to the NSP. The ICC performs inter-platform routing for any distributed platform. Essentially, this means that whenever a peripheral platform (including MCP, PM, Signaling Gateway) needs to communicate with a second (or multiple) peripheral platform, the message is sent to the ICC and the ICC reroutes it to the required destination. Advantageously, this feature offloads the NSP since the above mentioned messages would normally be routed via the NSP. This bypass provides the NSP with additional capacity.

Figure 2:
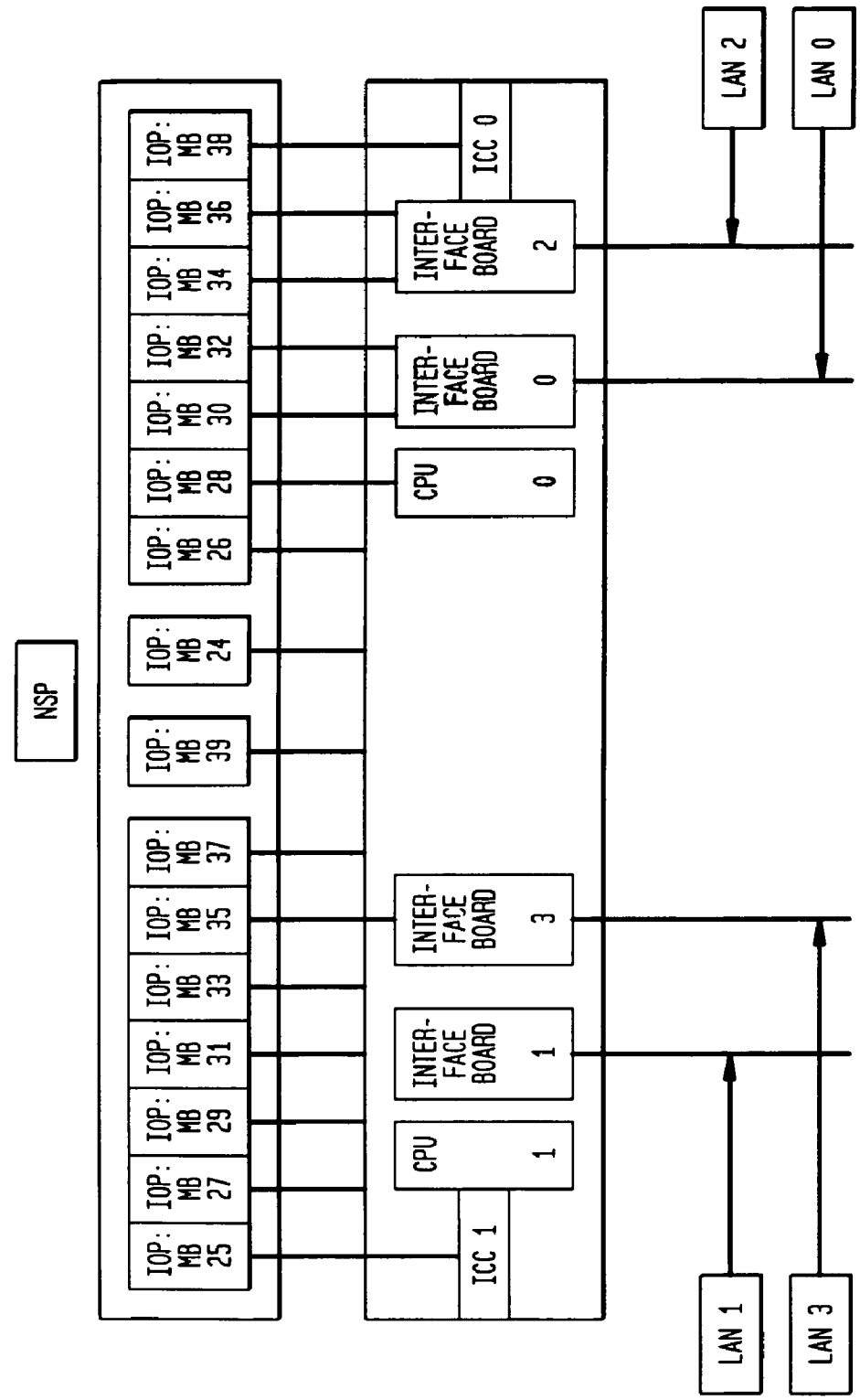
FIG. 2 shows a block diagram of the interconnection between the NSP, ICC and the LANs according to a preferred embodiment of the present invention.

Referring to FIG. 2, which shows the interconnection between the ICCs, the NSP, and the LANs. The ICC includes an interface board for signaling interface between CP113C (IOP:MB. This is an 8-bit parallel interface) and ICC. The interface board connects directly with a controller board which acts as a multiplexer. One controller board supports up to 8 interface connections and therefore by extension, 8 IOP:MB interfaces. If additional IOP:MB interfaces need to be supported, this is accomplished by adding interface boards (which support up to 4 interfaces) and/or controller boards. The application software (SW) communicates with the controller board via DMA (bi-directionally), so that NSP messages may be received and sent. Lastly, the LAN controller provides the actual interface to the MCPs, PM, and Signaling Gateway. The application entity therefore provides the bi-directional connection path between the NSP format messages and the Ethernet messages. The ICC preferably comprises a Pentium classed CPU.

The media control platform (MCP) provides a platform for media control functions, which work with the software in the NSP to provide media control features. The MCP also provides a platform for MCP Manager Functions and performs Media Control Tasks (MCTs) running simultaneously under a real-time operating system (VxWorks). Each Media Control Task is an independent call-processing entity. The NSP runs EWSD LTG software to provide the MCT functions.

The MCP Manager Functions are distributed across the following tasks: Messaging task: This task is multi functional. It provides the interface to the Ethernet for communication between all tasks on the MCP and the NSP or other distributed platforms. It also provides an interface with the ICC for maintenance of the LAN and the message channels associated with the Media Control Tasks.

SW Watchdog task: This task is responsible for monitoring all MCP tasks to ensure that each task is running correctly. MCT Loading & Startup Task: This task provides an interface to the NSP for loading of MCT software. It is also responsible for managing and manipulating the context associated with each MCT, and for spawning each MCT task in its correct context.

MCP Maintenance Task: This task performs general maintenance functions on the MCP, including handling reset requests from the NSP, routine test and audit functions, utilities and processing firmware upgrades.

The packet manager (PM) provides the interface to the Media Gateway for the hiQ architecture. The incoming signaling is done via ISUP (ISDN User Part), BICC (Bearer Independent Call Control) and MGCP (Media Gateway Control Protocol) messaging. The PM platform preferably comprises a commercially available Sun FT1800 fault tolerant system. Connection to the hiQ is done via redundant Ethernet paths on the internal LAN. Maintenance of the PM is by a periodic message sent from the NSP to the PM via each redundant LAN segment. The PM responds to this message on each LAN side. The purpose of this messaging is two-fold in that it serves to inform the NSP that the PM is still available and secondly, the message from NSP to PM should contain the active LAN side so that the PM knows which LAN side to use when transmitting to the NSP and/or any other peripheral platform.

The interface between NSP and ICC is an 8-bit serial interface which mimics the IOP:MB to Message Buffer interface. A Local Area Network (LAN) connects the ICC to the system periphery (MCP, PM, SP). This connection is realized using a Fast Ethernet (100 MB/S) LAN segment.

The hiQ protocol is encapsulated in a standard protocol (e.g., Ethernet for Release 1 & 2, UDP/IP from Release 3 on.). This allows for transmission over a commercial LAN and LAN Switches. Advantageously, the hiQ protocol provides encapsulation to the application specific protocols and messages, by providing transport services to the application.

According to a preferred embodiment of the present invention, the hiQ protocol includes message frames with encapsulation of application messages in standard LAN protocol, such as Fast Ethernet. The use of a standard LAN protocol in the hiQ protocol according to the present invention facilitates the open distributed network environment that supports multiple services on a common networking infrastructure.

The Ethernet LAN supports the message transfer modes offered by the NSP in single out, collective out and broadcast out. The hiQ protocol provides the addressing capabilities to address all units connected to the LAN with a single message; allows addressing a single unit and a single application running on that unit; allows addressing a redundant pair of units and redundant pair of applications; and allows addressing a single unit and multiple applications in each unit.

Figure 3:
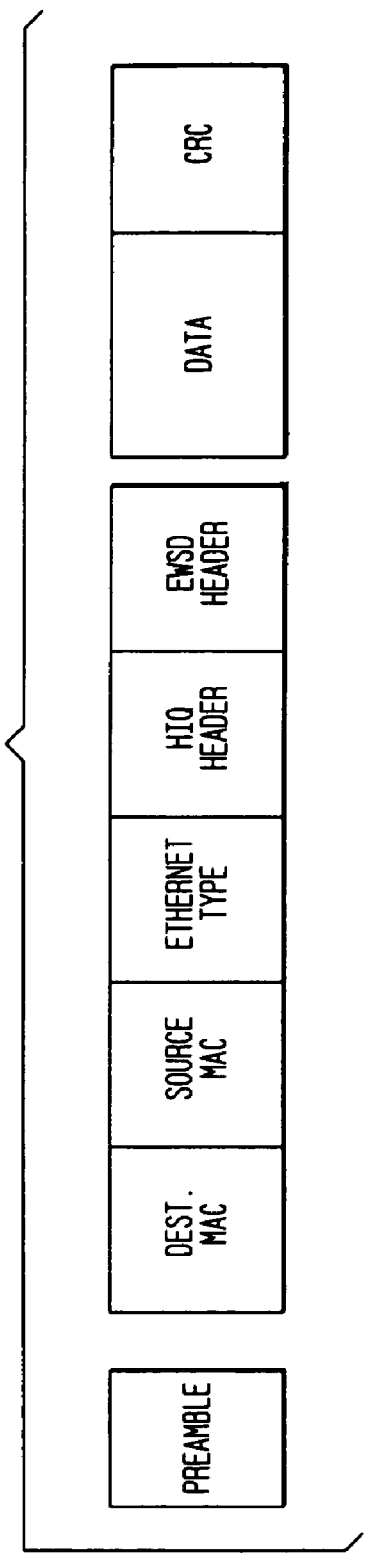
FIG. 3 shows a hiQ protocol message frame according to the present invention.

FIG. 3 shows a hiQ protocol communication frame having encapsulated application task and standardized LAN protocol. Referring to FIG. 3, the Ethernet type field is used to distinguish internal Ethernet messages from other protocol based messages (e.g. SCTP). The hiQ header is preferably a bitmap(8 bytes). The ICC uses this bitmap including the Destination MAC and Source MAC to inform the MCP to which applications (e.g., MCT's) to send the encapsulated command. The information in the data field is the actual command or message information. Therefore, to accomplish single outs (unicast), collective outs (multicast) or broadcast outs, the unique board addresses are used with the corresponding MCT bitmap set. Responses from each MCT are seen as a standard NSP message encapsulated within a MAC frame.

Figure 4:
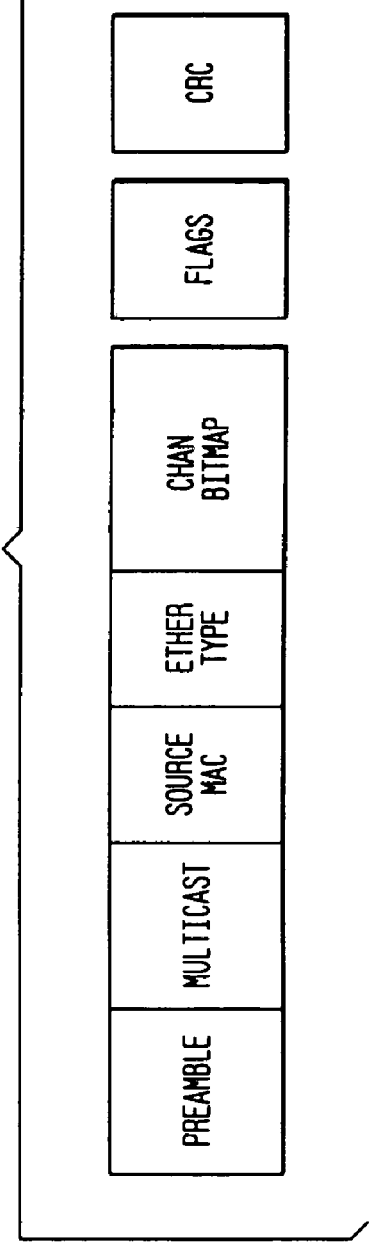
FIG. 4 shows another hiQ protocol message frame according to the present invention.

FIG. 4 shows a hiQ multicast communication frame. The multi-cast domain is used by the ICC, which employs a so called "flags" Ethernet frame (sent on each LAN side) to ensure that each MCP is accessible. The message is sent once and received by each MCP. The ICC sends this message every 100 ms. Included in this message is a bitmap of which MCP boards are currently active. The MCP can then use this information to ensure that sync channel messages or reports are routed on the correct LAN side. Advantageously, the methodology according to the present invention provides a virtual link between ICC sides. In such configuration, the failure of a single Ethernet on any board is known by all other boards. This bitmap includes the information of boards on the second LAN segment (where applicable). Preferably, the "flags" are detected from the bit pattern H'7F7F in the data section of the frame.

If any board does not respond with a flag response within a preset time limit, the ICC will retry the non-responsive boards. If there is still no response, the ICC will issue a channel error per board with a bitmap to show how many MCT tasks are impacted. The error handling and appropriate action is then taken by the particular fault analysis program in the NSP.

Thus, the hiQ messaging protocol facilitates a centralized maintenance master, in this embodiment the ICC, to address all the units of the system connected to the corresponding LAN. Each individual unit responds to the request. These responses provide centralized maintenance. By monitoring the response to the broadcast request, the maintenance master (the ICC) can determine units which fail to respond. These failing units can be reported as defective for alarming purposes.

By broadcasting the last set of responses—in one message, the maintenance master notifies all connected units of the status of the rest. This allows each unit to have a complete "connectivity" map and use this information for routing decision within the internal communication fabric.

The hiQ is a redundant system where there are always two units and two paths to ensure reliable operation (single failure protection). The hiQ messaging protocol allows the distribution of a single message to the two partners of a redundant pair. The pair works in an ACTIVE/ACTIVE or ACTIVE/STANDBY mode. ACTIVE/ACTIVE meaning both partners in the redundant pair are processing, in most cases different applications, but are receiving multicast messages so that one can be switched-over to cover the other. In ACTIVE/STANDBY, one of the partner pairs is processing in ACTIVE mode while the other is on STANDBY. The messaging system allows the delivery of a single message to both members of the pair. This provides the needed synchronization for units and processes.

The above-described test/monitoring method is also applicable to testing/monitoring the LANs. If all flag responses fail, the ICC sends an additional LAN test message to its own Media Access Control (MAC) address. If the LAN test message is received, all MCP boards are marked as faulty (with the appropriate channel error messages being sent to the NSP). If the LAN test message is not received, the ICC reports a LAN failure to the NSP.

Each MCP has a MAC address which maps to the board number. Upon power up each board detects its slot and shelf number. This information translates into a mapped MAC address (the mapped addresses are common to each system). For example, the addressing protocol may assign IP addresses 224.xxx to 239.xxx for multicast messages and broadcast messages beginning at 255.xxx. This mapping is also known by the ICC. To accomplish communication, the unique MAC addresses are used in conjunction with a multi-cast domain. Communication to one MCP board is accomplished using a standard communication frame. Each MCP can carry up to 62 MCT's. Each MCT is numbered as X-Y where X is the MCP number and Y is the task number. For communications purposes and fault handling purposes, the TSG-LTG mapping is adapted to be MCP-MCT mapping.

Accordingly, applications such as MCTs performed by the MCPs and packet manager tasks performed by the PMs are distributed and processing is decentralized. On the other hand, fault location, monitoring, and reporting is centralized, through the ICC and LAN. The hiQ architecture according to the present invention provides redundancy via having two copies of each component unit (side 0 and side 1). A failure of one unit automatically causes a switchover to the secondary unit (without any service interruption). This is handled via the Fault Analysis SW running on the NSP. Both LAN sides (LAN0 and LAN 1) are active but each carries half the traffic using standard Line Trunk Group (LTG) message channel distribution, i.e. each task has a different default active/standby side. If a LAN failure occurs, the switchover causes the remaining LAN to carry the full traffic load.

According to another embodiment of the present invention, the MCPs supports redundancy by distributing MCT's in such a way that each task has a partner which runs on a different MCP. That means that the failure of a single MCT results in its functionality being taken over by the "partner" board. Ultimately, this says that the failure of an MCP board results in the switchover of each MCT being carried by that board. The Signal System Network Control (SSNC) redundancy is realized with each unit (e.g. MPU) having a redundant partner. For example, the MP's include two MPU's which run micro-synchronously.

The SSNC is used to perform the signaling gateway functionality. The SSNC is a multi-processor system with its own Maintenance devices disks and optical devices. It is preferably "loosely coupled" to the NSP via an ATM30 link. The SSNC performs the task of terminating the #7 from the network and converting the signaling into hiQ compatible messaging. The SSNC further controls the routing of messages to NSP or MCT's. Further, the SSNC will route #7 messages from the hiQ to the network. The SSNC terminates pure SS7 links or the SS7 links are replaced by SCTP associations.

According to another aspect of the present invention relating to fault location/reporting, MCP failure cases reported to the NSP comprise (besides MCT task failures) platform task failures and failures of the entire board. Upon a platform task failure the MCP resets itself and reports the reset to the ICC. A failure of the board is either detected by the a watchdog of the MCP (which leads to an MCP reset) or the ICC which sends periodic FLAGS commands to all MCPs. Unacknowledged FLAGS commands lead to a MCP board failure determination by the ICC. In both cases the ICC informs the NSP via message channel errors and the NSP switches the redundant MCP copy on. The affected MCT's are configured accordingly to the same state in a serial manner, depending on a LOAD parameter entry (YES/NO). The MCP status is dependent on the states of its MCT's, e.g., if the last MCT of an MCP is configured to PLA then the MCP also has to change to PLA.

According to an aspect of the present invention relating to alarming functions, upon determination of a faulty component from the responses from each of the units connected to the LAN, an alarm is triggered. The MP collects all hiQ alarms. All alarms not generated on the SSNC side are sent over from CP System Alarming to the MP. For local alarm representation the MP contains an Alarm Indication Unit that is able to present all alarms via Critical, Major and Minor indications including relays to the existing Alarm Interface Unit (AIU).

Sections 2.1.1, 2.1.2.2.2, 2.1.4, 3.1, 3.2, and 3.2.1.3 of the Functional Specification SURPASS Release NN.N; P30310-A2745-Q001-04-7659 are particularly pertinent to embodiments of the present invention. These sections are incorporated-by-reference herein.

Glossary and Abbreviations

| | |
|---|---|
| ACT | Active |
| AMA | Automatic Message Accounting |
| AMP | ATM Bridge Processor |
| APS | Application Program System |
| ARP | Address Resolution Protocol |
| ASCHK | Acknowledge Segment Checksum (message from MCP to NSP) |
| ATM | Asynchronous Transfer Mode |
| B:CMY | Bus for Common Memory |
| B:IOC | Bus for IOC |
| BAP | Base Processor |
| BHCA | Busy Hour Call Attempts |
| BICC | Bearer Independent Call Control |
| BIOS | Basic Input/Output System |
| CAF | Console Alarms and Fans |
| CALLP | Call Processing Process |
| CAP | Call Processor |
| CCG | Central Clock Generator |
| CCNC | Common Channel Signaling Network Control |
| CFS | Call Feature Server |
| CHAC | Channel Active (command from NSP to MCP) |
| CHAR | Channel Ready (message from MCP to NSP) |
| CHAS | Channel Active Switched (message from MCP to NSP) |
| CHECK | Checksum (command from NSP to MCP) |
| CHON | Channel On (command from MCP/ICC to MCP) |
| CI | Critical Indicator |
| CLAC | Clock Active (command from NSP to MCP) |
| CMY | Common Memory |
| CoPL | Commercial Computing Platform |
| CORBA | Common Object Request Brokerage Architecture |
| COU | Conference Unit |
| CP | Coordination Processor |
| CPCI | Compact PCI |
| CPU | Central Processing Unit |
| CR | Code Receiver |
| CRC | Cyclic Redundancy Check |
| DB | Database |

-continued

| | |
|---|---|
| DIP | Dual Inline Parallel |
| DIU | Digital Interface Unit |
| DLU | Digital Line Unit |
| DMA | Direct Memory Access |
| DRAM | Dynamic RAM |
| EAI | Emergency Action Interface |
| EMC | Electromagnetic Charge |
| ENM | EWSD Network Manager |
| EPROM | Erasable Programmable Read Only Memory |
| EPSONE | Equipment Practice for Siemens Solution O.N.E. |
| EQN | Equipment Number |
| ES-IS | End System-to-Intermediate System |
| EWSD | Electronisches Wahlsystem Digital (= Digital Switching System) |
| FDDI | Fibre Distributed Data Interface |
| FS | Functional Specification |
| FTP | File Transfer Protocol |
| FW | Firmware |
| GDT | Global Descriptor Table |
| GDTR | Global Descriptor Table Register |
| GP | Group Processor |
| GUI | Graphical User Interface |
| HSRP | Hot Standby Router Protocol |
| HW | Hardware |
| I/F | Interface |
| IC | Integrated Circuit |
| ICC | Inter-Connect Controller |
| ICMP | Internet Control Message Protocol |
| ID | Identifier |
| IDCI | Interim Defined Central Office Interface |
| IDT | Interrupt Descriptor Table |
| IDTR | Interrupt Descriptor Table Register |
| IEEE | Institute of Electrical and Electronic Engineers |
| IETF | Internet Engineering Task Force |
| IFTR | Interface Tracer |
| IOC | Input/Output Controller |
| IOP | Input/Output Processor |
| IP | Internet Protocol |
| IRDP | ICMP Router Discovery Protocol |
| ISDN | Integrated Services Digital Network |
| ISG | Integrated Signaling Gateway (SSNC) |
| ISTART | Initial Start |
| ISUP | ISDN Signaling User Part (SS7) |
| ITU-T | International Telecommunications Protocol |
| JC1 | Job Code 1 |
| LAN | Local Area Network |
| LAPD | Link Access Procedure type D |
| LED | Light Emitting Diode |
| LM | Feature (from the German Leistungsmerkmal) |
| LODAP | Load Data Parameter (command from NSP to MCP) |
| LST | Line Status Table |
| LTAC | LTG Active (command from NSP to MCP) |
| LTAS | LTG Active Switched (message from MCP to NSP) |
| LTG | Line Trunk Group |
| LTU | Line Trunk Unit |
| MAC | Media Access Control |
| MB | Message Buffer |
| MB(B) | Message Buffer Type B |
| MBD | Message Buffer Type D |
| MBL | Maintenance Blocked |
| MBU | Message Buffer Unit |
| MBUL | Message Buffer Unit: LTG |
| MBUS | Message Buffer Unit: SGC |
| MB/S | Megabits per second |
| MCH | Message Channel |
| MCP | Media Control Platform |
| MCPM | Media Control Platform Manager (VxWorks Shell Management Tasks) |
| MCT | Media Control Tasks (Virtual LTG's) |
| MG | Media Gateway |
| MGC | Media Gateway Controller |
| MGCC | Media Gateway Call Control |
| MGCP | Media Gateway Control Protocol |
| MIB | Managed Information Base |
| MIO | Maintenance I/O Channel |
| MML | Man-Machine Language |
| MMN | Maintenance Manual Number |
| MP | Main Processor |
| MPOA | Multi Protocol Over ATM |

-continued

| | |
|---|---|
| Ms | Milliseconds |
| MSG | Message |
| MTP | Message Transfer Part |
| NEBS | Network Equipment-Building System |
| NIC | Network Interface Card |
| NSP | Network Services Processor |
| NSTARTn | Newstart n, n = 0, 1, 2, 3 |
| NVM | Non Volatile Memory |
| OAM&P | Operations, Administration, Maintenance and Provisioning |
| OC3 | Optical Carrier 3 |
| OEM | Original Equipment Manufacturer |
| OpEt | Open Platform EWSD Transport |
| OS | Operating System |
| OSI | Open Systems Interconnection |
| OSPF | Open Shortest Path First |
| OSS | Operations Support System |
| OST | Operating State |
| PAREN | Load Data Parameter Received (message from MCP to NSP) |
| PC | Personal Computer |
| PCI | Peripheral Component Interconnect |
| PCU | Packet Control Unit |
| PDH | Plesiochronous Digital Hierarchy |
| PLA | Planned |
| PM | Packet Manager |
| PRAC | MCT Recovery Acknowledgement (message from MCP to NSP) |
| RAM | Random Access Memory |
| RCP | Remote Control Processor |
| RCU | Remote Control Unit |
| RCVR | Recover MCT (command from NSP to MCP) |
| RES | Restorable |
| RFC | Request for Comment |
| RIP | Routing Information Protocol |
| ROM | Read Only Memory |
| RSU | Remote Switching Unit |
| SBC | Single Board Computer |
| SC | Smart Commander |
| SCCS | Switching Control Center System |
| SCTP | Stream Control Transmission Protocol |
| SDC | Secondary Digital Carrier |
| SDH | Synchronous Digital Hierarchy |
| SDRAM | Single Data Random Access Memory |
| SG | Signaling Gateway |
| SGC | Switch Group Control |
| SIPAC | Siemens Package System |
| SLST | Service LST |
| SN | Switching Network |
| SNMP | Simplified Network Management Protocol |
| SPSB | Switching Periphery Simulator B Board (Controller) |
| SPSC | Switching Periphery Simulator C Board (Interface) |
| SPSD | Switching Periphery Simulator D Board (Port) |
| SPSE | Switching Periphery Simulator E Board (Converter) |
| SPSF | Switching Periphery Simulator F Board (Frame) |
| SS | Subsystem |
| SSG | Space Stage Group |
| SSNC | Signaling System Network Control |
| SS7 | Signaling System No. 7 |
| STAF | Standard Failure |
| STM1 | Synchronous Transfer Mode, Level 1 |
| SW | Software |
| SWO | Switchover |
| SYNC | MCT-MCT Synchronization Channel |
| SYP | System Panel |
| T1 | Transmission Signal Level 1 |
| TCP | Transmission Control Protocol |
| TDM | Time Division Multiplexed |
| TERE | Test Result (message from MCT to NSP) |
| TSG | Time Stage Group |
| TTL | Transistor Transistor Logic |
| UDP | User Datagram Protocol |
| UNA | Unavailable |
| USB | Universal Serial Bus |
| UTP | Unshielded Twisted Pair |
| VLAN | Virtual LAN |
| VoA | Voice over ATM |
| VoATM | Voice over ATM |
| VoIP | Voice over IP |

-continued

| | |
|---|---|
| VRRP | Virtual Router Redundancy Protocol |
| WAN | Wide Area Network |
| WM | World Market |

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the present invention. All such changes and modifications are intended to be included within the scope of the invention as defined by the appended claims.

We claim:

1. A telecommunications system having a network services processor (NSP) for handling telecommunications in conformance with a predefined signaling system and for distributing processing applications including call handling and routing to a plurality of platforms, each platform having a unique address and responds to application specific messages, comprising:
a plurality of packet managers (PMs) for accessing, processing, and distributing packetized call data over a packet network;
a plurality of media control platforms (MCPs) for accessing, processing, and distributing media tasks (MCTs);
a plurality of interconnect controllers (ICCs) and corresponding plurality of local area networks (LANs), each for interfacing the NSP with the plurality of platforms including the PMs and the MCPs through a corresponding LAN, wherein a message protocol (hiQ) is employed which encapsulates the application specific messages within a standard LAN protocol for distribution among the plurality of platforms connected to the LANs.

2. The system of claim 1, wherein the hiQ protocol includes a unicast message frame wherein one of the plurality of platforms connected to the LANs is addressed.

3. The system of claim 1, wherein the plurality of LANs include at least one partner pair of LANs, acting as primary and redundant LANs in active and standby modes, the plurality of platforms connected to the primary LAN being active in processing applications and the plurality of platforms connected to the redundant LAN being in standby mode.

4. The system of claim 1, wherein the hiQ protocol includes a multicast message frame wherein each pair of the plurality of platforms connected to the LANs are addressed.

5. The system of claim 4, wherein the ICC includes means for switching over a redundant LAN from standby to active upon determination of a fault in a platform connected to the primary LAN.

6. The system of claim 1, wherein the hiQ protocol includes a broadcast message frame wherein all of the plurality of platforms connected to the LANs is addressed.

7. The system of claim 1, wherein the ICC distributes a first broadcast message frame having a status request broadcasted to the plurality of platforms connected to the LANs, and the ICC performs fault identification and location among the plurality of platforms by examining responses received from the plurality of platforms.

8. The system of claim 7, wherein the ICC determines a fault exists in a platform if the platform fails to respond to the status request within a specified period of time.

9. The system of claim 7, wherein the ICC distributes a second broadcast message frame which includes responses from all the plurality of platforms connected to the LANs to provide a connectivity map of each of the plurality of platforms connected to the LANs.

10. The system of claim 9, wherein the first broadcast message frame and the second broadcast message frame are consecutive message frames.

11. A method of message handling in a telecommunications system having a network services processor (NSP) for accessing, processing, and distributing telecommunications in conformance with a predefined signaling system and for distributing processing applications including call handling and routing to a plurality of platforms, each platform having a unique address and responds to application specific messages, the method comprising:

connecting the plurality of platforms to local area networks (LANs), the plurality of platforms include packet managers (PMs) for accessing, processing, and distributing packetized call data over a packet network and a plurality of media control platforms (MCPS) for accessing, processing, and distributing media tasks (MCTs);

connecting the LANs to a corresponding plurality of interconnect controllers (ICCs), each ICC for interfacing the NSP with the plurality of platforms through a corresponding LAN; and distributing application specific messages to the plurality of platforms via a message protocol (hiQ) having a message frame which encapsulates application specific messages within a standard LAN protocol.

12. The method of claim 11, wherein the hiQ protocol includes an unicast message frame wherein one of the plurality of platforms connected to the LANs is addressed.

13. The method of claim 11, further including assigning one partner pair from the plurality of LANs to act as primary and redundant LANs in active and standby modes, the plurality of platforms connected to the primary LAN being active in processing applications and the plurality of platforms connected to the redundant LAN being in standby mode.

14. The method of claim 13, wherein the hiQ protocol includes a multicast message frame wherein each pair of the plurality of platforms connected to the LANs are addressed.

15. The method of claim 14, further including the step of switching over a redundant LAN from standby to active upon determination of a fault in a platform connected to the primary LAN.

16. The method of claim 11, wherein the hiQ protocol includes a broadcast message frame wherein all of the plurality of platforms connected to the LANs is addressed.

17. The method of claim 11, further including the steps of distributing a first broadcast message frame having a status request broadcasted to the plurality of platforms connected to the LANs, and performing fault identification and location among the plurality of platforms by examining responses received from the plurality of platforms.

18. The method of claim 17, wherein the fault is identified and located when a platform fails to respond to the status request within a specified amount of time.

19. The method of claim 17, further including the step of distributing a second broadcast message frame which includes responses from all the plurality of platforms connected to the LANs.

20. The method of claim 19, wherein the first broadcast message frame and the second broadcast message frame are consecutive message frames.

21. The method of claim 11, wherein the standard LAN protocol is UDP/IP.

22. The method of claim 11, wherein the predefined signaling system is SS7.

* * * * *